(12) United States Patent
Greschler et al.

(10) Patent No.: US 7,200,632 B1
(45) Date of Patent: Apr. 3, 2007

(54) METHOD AND SYSTEM FOR SERVING SOFTWARE APPLICATIONS TO CLIENT COMPUTERS

(75) Inventors: David M. Greschler, Sharon, MA (US); Owen Mysliwy, Beverly, MA (US); Stuart Schaefer, Somerville, MA (US)

(73) Assignee: Softricity, Inc., Boston, MA (US)

( * ) Notice: Subject to any disclaimer, the term of this patent is extended or adjusted under 35 U.S.C. 154(b) by 0 days.

(21) Appl. No.: 09/527,188

(22) Filed: Mar. 17, 2000

Related U.S. Application Data

(63) Continuation-in-part of application No. 09/456,181, filed on Dec. 7, 1999, now abandoned.

(60) Provisional application No. 60/128,828, filed on Apr. 12, 1999.

(51) Int. Cl.
*G06F 15/16* (2006.01)

(52) U.S. Cl. ............... 709/203; 709/227; 709/228; 709/229

(58) Field of Classification Search ........ 709/227–229, 709/203
See application file for complete search history.

(56) References Cited

U.S. PATENT DOCUMENTS

| | | | |
|---|---|---|---|
| 5,572,643 A * | 11/1996 | Judson | 709/218 |
| 5,644,718 A * | 7/1997 | Belove et al. | 709/227 |
| 5,708,709 A | 1/1998 | Rose | |
| 5,737,619 A * | 4/1998 | Judson | 715/500 |
| 5,758,074 A | 5/1998 | Marlin et al. | 395/200.8 |
| 5,826,014 A | 10/1998 | Coley et al. | 395/187.01 |
| 5,867,651 A | 2/1999 | Dan et al. | |
| 5,892,914 A | 4/1999 | Pitts | |
| 5,892,954 A | 4/1999 | Tomas et al. | |
| 5,900,871 A * | 5/1999 | Atkin et al. | 715/866 |
| 5,915,119 A | 6/1999 | Cone | |
| 5,919,247 A | 7/1999 | Van Hoff et al. | |
| 5,928,330 A * | 7/1999 | Goetz et al. | 709/231 |
| 5,930,792 A * | 7/1999 | Polcyn | 707/9 |
| 5,941,908 A | 8/1999 | Goldsteen et al. | 623/1 |

(Continued)

FOREIGN PATENT DOCUMENTS

EP   0778512 A2   6/1997

(Continued)

OTHER PUBLICATIONS

Domel, P., "Mobile Telescript Agents and the Web," Digest of Papers of the Computer Society Computer Conference Compcon, US, Los Alamitos, IEEE Computer Society Press, vol. Conf. 41, Feb. 25, 1996, pp. 52-57, XP000628465.

(Continued)

*Primary Examiner*—Ario Etienne
*Assistant Examiner*—LaShonda Jacobs
(74) *Attorney, Agent, or Firm*—Senniger Powers

(57) ABSTRACT

A method and system for serving software applications to remote clients across the internet, for example, is disclosed that preferably utilizes standard, SMB (server message block), protocols, which are available in commercial operating systems. Further, an associated business method is described in which subscribing institutions can out-source the application serving to a third party institution, transparently. Finally, a port proxy system is provided that enables tunneling through firewalls that are configured to block communications from SMB ports.

26 Claims, 12 Drawing Sheets

U.S. PATENT DOCUMENTS

| | | | |
|---|---|---|---|
| 5,941,954 A | | 8/1999 | Kalajan |
| 5,941,959 A | | 8/1999 | Fishler et al. |
| 5,956,483 A | | 9/1999 | Grate et al. |
| 5,978,828 A | * | 11/1999 | Greer et al. ............... 709/224 |
| 5,987,523 A | | 11/1999 | Hind et al. |
| 6,002,853 A | * | 12/1999 | de Hond .................... 709/219 |
| 6,006,252 A | | 12/1999 | Wolfe |
| 6,012,090 A | | 1/2000 | Chung et al. ............... 709/219 |
| 6,061,349 A | | 5/2000 | Colle et al. |
| 6,067,585 A | | 5/2000 | Hoang |
| 6,076,115 A | * | 6/2000 | Sambamurthy et al. ..... 709/250 |
| 6,078,951 A | * | 6/2000 | Pashupathy et al. ........ 709/217 |
| 6,088,796 A | | 7/2000 | Cianfrosca et al. |
| 6,098,067 A | * | 8/2000 | Erickson ...................... 707/10 |
| 6,101,549 A | | 8/2000 | Baugher et al. ............. 709/238 |
| 6,119,165 A | * | 9/2000 | Li et al. ...................... 709/229 |
| 6,125,352 A | | 9/2000 | Franklin et al. |
| 6,138,162 A | | 10/2000 | Pistriotto et al. ........... 709/229 |
| 6,151,643 A | | 11/2000 | Cheng et al. |
| 6,163,806 A | | 12/2000 | Viswanathan et al. |
| 6,212,560 B1 | | 4/2001 | Fairchild |
| 6,212,564 B1 | * | 4/2001 | Harter et al. ............... 709/228 |
| 6,226,680 B1 | | 5/2001 | Boucher et al. |
| 6,247,013 B1 | * | 6/2001 | Morimoto ................... 707/10 |
| 6,249,528 B1 | | 6/2001 | Kothary |
| 6,272,673 B1 | * | 8/2001 | Dale et al. .................. 717/100 |
| 6,295,639 B1 | | 9/2001 | Van Der Meer |
| 6,324,578 B1 | * | 11/2001 | Cox et al. ................... 709/223 |
| 6,356,863 B1 | | 3/2002 | Sayle |
| 6,360,366 B1 | * | 3/2002 | Heath et al. ................. 717/178 |
| 6,405,111 B2 | * | 6/2002 | Rogers et al. ................ 701/33 |
| 6,412,009 B1 | | 6/2002 | Erickson et al. |
| 6,421,726 B1 | * | 7/2002 | Kenner et al. .............. 709/225 |
| 6,434,620 B1 | | 8/2002 | Boucher et al. |
| 6,502,137 B1 | * | 12/2002 | Peterson et al. ............ 709/229 |
| 6,546,554 B1 | * | 4/2003 | Schmidt et al. ............. 717/176 |
| 6,578,199 B1 | | 6/2003 | Tsou et al. |
| 6,711,622 B1 | * | 3/2004 | Fuller et al. ................. 709/231 |
| 6,771,290 B1 | | 8/2004 | Hoyle |
| 6,816,544 B1 | | 11/2004 | Bailey et al. |
| 2001/0043215 A1 | | 11/2001 | Middleton et al. |

FOREIGN PATENT DOCUMENTS

| | | | |
|---|---|---|---|
| WO | WO 98/07085 | | 2/1998 |
| WO | WO 99/27460 | * | 6/1999 |

OTHER PUBLICATIONS

Evans, E., and Rogers, D., "Using Java Applets and Corba For Multi-User Distributed Applications," IEEE Internet Computing, US, vol. 1, No. 3, May 1997-Jun. 1997, pp. 43-55, XP002080603.

Edwards, Mark Joseph, "Network Client and Workstation Concerns", http://windowsitlibrary.com/Content/121/08/4.html., Dec. 1997, pp. 1-2.

"Helpers and Plug-In's" Yale University Jan. 10, 1997.

Peng, Zhong-Ren. "An Assessment of the Development of Internet GIS" Abstract fpr URISA '97.

* cited by examiner

METHOD AND SYSTEM FOR SERVING SOFTWARE APPLICATIONS TO CLIENT COMPUTERS

RELATED APPLICATIONS

This application is a continuation-in-part application of U.S. patent application Ser. No. 09/456,181, filed on Dec. 7, 1999 now abandoned, the entire teachings of which are incorporated herein by this reference.

This application claims the benefit of U.S. Provisional Application No. 60/128,828, filed Apr. 12, 1999 the entire teachings of which are incorporated herein by this reference.

BACKGROUND OF THE INVENTION

Network delivery of application-program style functionality has become increasingly important. The ubiquitous client-server platform typically requires that the application program code be loaded and installed on the client computers. This requirement, however, is viewed as substantially increasing the installation and maintenance costs associated with computer networks. Moreover, many client operating system platforms are deemed unstable. Network delivery of applications programs would enable the code to be maintained only on the server-side, rather than distributed throughout the network.

Additionally, there are a number of different business models that are pulling for network delivery of application program functionality. First, it can be used in software sales. A web-based software-sales institution can utilize the Internet, or other public network, to allow customers to "test-drive" the programs, and thereby increase sales. A second justification for deployment arises in the thin-client/network-computer model where the code required for the application-functionality and user data reside on the server. In this situation, when required at the thin client, the application code is provided by the server on an as-needed basis. These servers can even be off-site in an application service provider (ASP) environment. Another justification surrounds the possibility to "rent" programs to users. A large number of potential users may have only limited requirements for certain classes of application programs. Their individual requirements may not justify investment in the typically expensive programs or not justify the costs of client installation. The thought here is to enable these users to rent access to the application programs, preferably via the Internet, to generate new revenue streams for the application software companies.

One solution to providing application program functionality to the client computer via the network involves expanding the functionality of the browser. For example, the term "plug-in" is used to describe a browser code extension. ActiveX and Java are two of the most common code platforms for the browser.

While the solution to provide application program functionality via the browser is attractive in its simplicity, a number of problems exist under current technology. First, providing sophisticated ActiveX and/or Java functionality is still in its infancy and largely untried. Further, it ignores the wealth of existing, stable application programs that have been written and are being written to run directly on operating systems, such as Windows 95/98/NT/2000, Unix, Linux, and Mac OS's.

Related, but limited, solutions attempt to allow potential buyers, for example, to "test drive" the program over the internet. Typically, one of two techniques have been used. First, the selling institution may allow the potential owner to download a trial-version of the program. This version may have reduced capabilities and/or a limited lifetime, where the program is disabled after it has been invoked a set number of times, or after a specified date. This process, however, is complex, often requiring a multi-step process in which the user must accept the download, pick a save-as location, watch the download, quit the browser, find the file on the hard drive, and run an installer, for example. Another technique is to extend the potential purchaser's browser in some fashion using, for example, a Java applet. This approach, however, shares the problems discussed previously relative to ActiveX and Java.

Against this backdrop, most modern computer/network operating systems allow for the execution of code that is stored remotely from the client computer. The systems allow a client computer to mount a physically remote drive, residing on a server or peer computer, and execute the application program residing there. Typically, however, these capabilities of the operating system are only utilized within an institution where an umbrella network management exercises control over both the clients and the servers to realize the necessary security levels, prevent corruption of data on the server side, and configure the client computers to access the server-stored code.

SUMMARY OF THE INVENTION

The present method and system are directed to serving applications over a computer network from an application server system to a target computer. A helper application is provided that handles client configuration to facilitate communications. As a result, in the preferred embodiment, standard networking protocols can be used.

In general, according to one aspect, the invention features a method for serving applications over a computer network from an application server system to a target computer. The method includes the target computer signaling the server system with a request for an application. The server system responds to the request by transferring an application descriptor to the target computer. The application descriptor is read by a helper application executing on the target computer. The helper application controls the target computer to execute the application, which resides on the server system.

In specific embodiments, the target computer signals the server system with the request for the application by user selection of the link, which is displayed by a browser and associated with the application. Preferably, the application link contains an application identifier that identifies the requested application to the server system and may further contain a session I.D, a user I.D, and a subscribing institution ID. Typically, activating this application link triggers the downloading of the application descriptor from the server system to the target computer. Preferably, the application descriptor is encrypted prior to transmission.

In the preferred embodiment, the helper application is invoked in response to receipt of the application descriptor on the target computer. Thereafter, transaction modes may be set and advertisements served to the target computer.

In general, according to another aspect, the invention can also be characterized in the context of an application serving system that operates across a computer network. The system comprises a target computer that requests an application. A server system is provided that responds to the request by transferring an application descriptor to the client computer. A helper process executing on the target computer reads this application descriptor and controls the target computer to execute the application, which resides on the application server system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
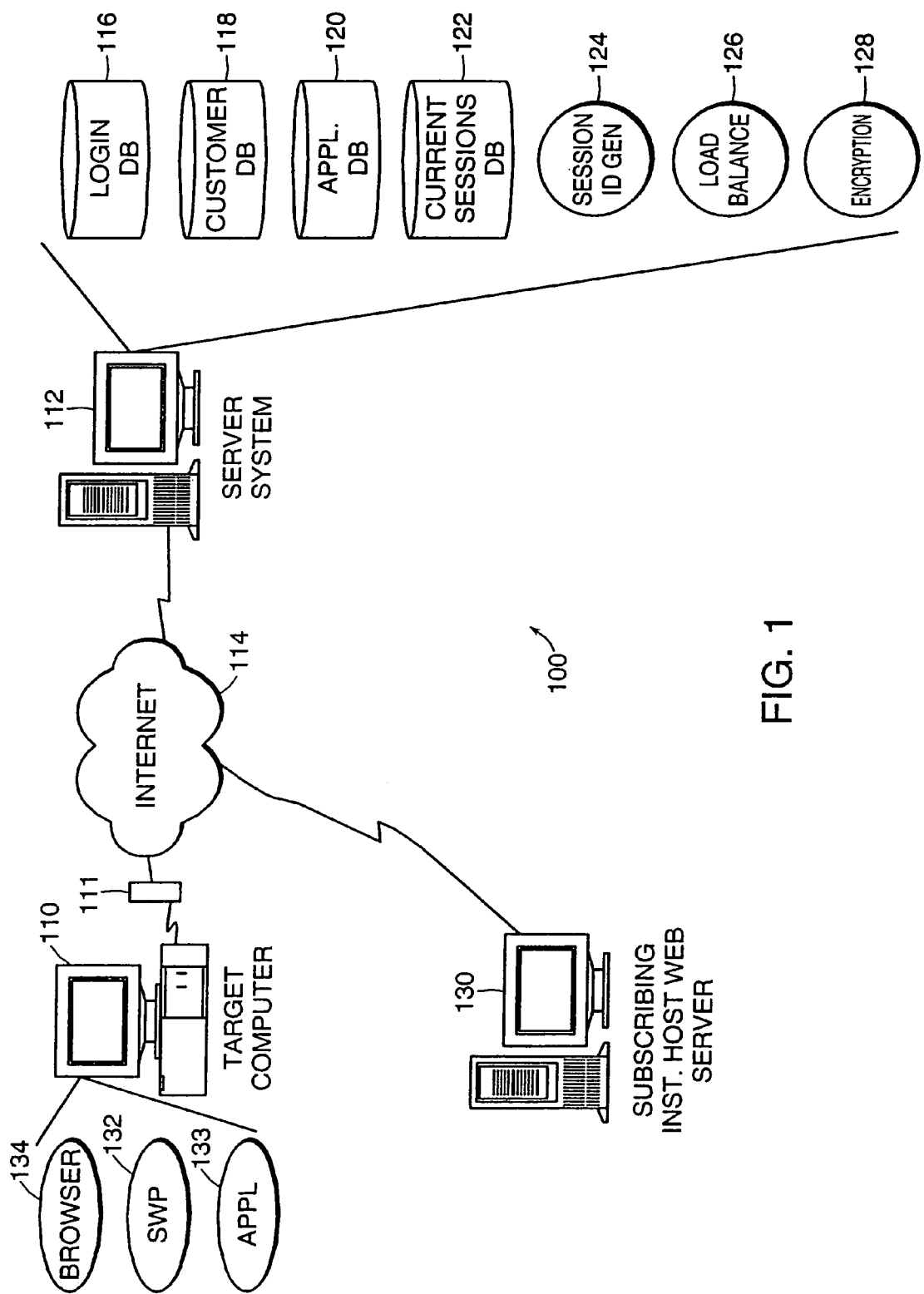
FIG. 1 is a schematic illustration showing the application serving system and specifically the interaction between the target client computer, the host Web server computer of the third-party subscribing institution, and the server system, according to the present invention.

FIG. 1 shows an application serving system 100, which has been constructed according to the principles of the present invention.

Generally, the application serving system 100 comprises the user, target client computer 110 that connects to a server system 112 and subscribing institution host Web Server 130, over a network 114.

Client computer 110, Web server 130, and server system 112 implement a network protocol layer to communicate across the network. In a preferred embodiment, network 114 is the Internet, or other public or private network, and the network protocol layers are TCP/IP and NetBios. Other network configurations and network protocols layers, however, could be implemented in place or in addition to those associated with the Internet such as those provided in other public or private networks and internetwork systems.

The target, client computer 110 is a PC computer in one implementation. It operates Microsoft Windows 95/98/NT/2000/CE operating system or other OS providing compatible API's (application programming interfaces), on an Intel processor/IBM-compatible hardware platform. Other alternatives, however, are possible such as open source operating system platforms, such as Linux, or Apple MAC OS's or other operating systems that provide the API support for these operating systems. Still further alternatives include embedded OS platforms such as Windows CE and Palm OS's, or similar reduced code-footprint systems.

The target computer 110 preferably has preinstalled application programs. In the present implementation, a browser 134, such as the ubiquitous Netscape Navigator or Microsoft Explorer browsers, is installed. Additionally, the target computer also preferably has a helper application or software player 132. Such pre-installation can be performed typically at a website hosted by the institution that operates the server system 112 or also the subscribing institution 130.

Depending on the institution managing the target computer, a firewall 111 may be present between the target computer and the network 114.

The subscribing institution, which maintains the host web server 130, is typically a third party relative to the institution, which maintains the server system 112 in one anticipated business model. The subscribing institution has a requirement, or desires to provide, application programs and the related functionality to the user at the target computer 110, but, rather than providing this functionality itself, the subscribing institution outsources this to the institution operating the server system 112. Nonetheless, the subscribing institution typically has an Internet presence. Specifically, it typically maintains a website/websites that offer the application programs to users.

From one implementation, the server system 112 is maintained by an institution that provides application programs to users as a paid service to subscribing institutions. Nonetheless, it should be appreciated that the technology of the present invention also has applicability to the business model where the server system 112 and host Web server 120 are maintained by the same institution. In this context, the institution does not wish to out-source the work associated with the serving of the applications, but wishes to provide this functionality through in-house expertise.

Specifically the service institution's server system 112 maintains a log-in database 116, a customer database 118, an application database 120, and a current sessions database 122. The server system additionally executes a session ID generator 124, a load balancing process 126, and an encryption process 128.

Figure 2:
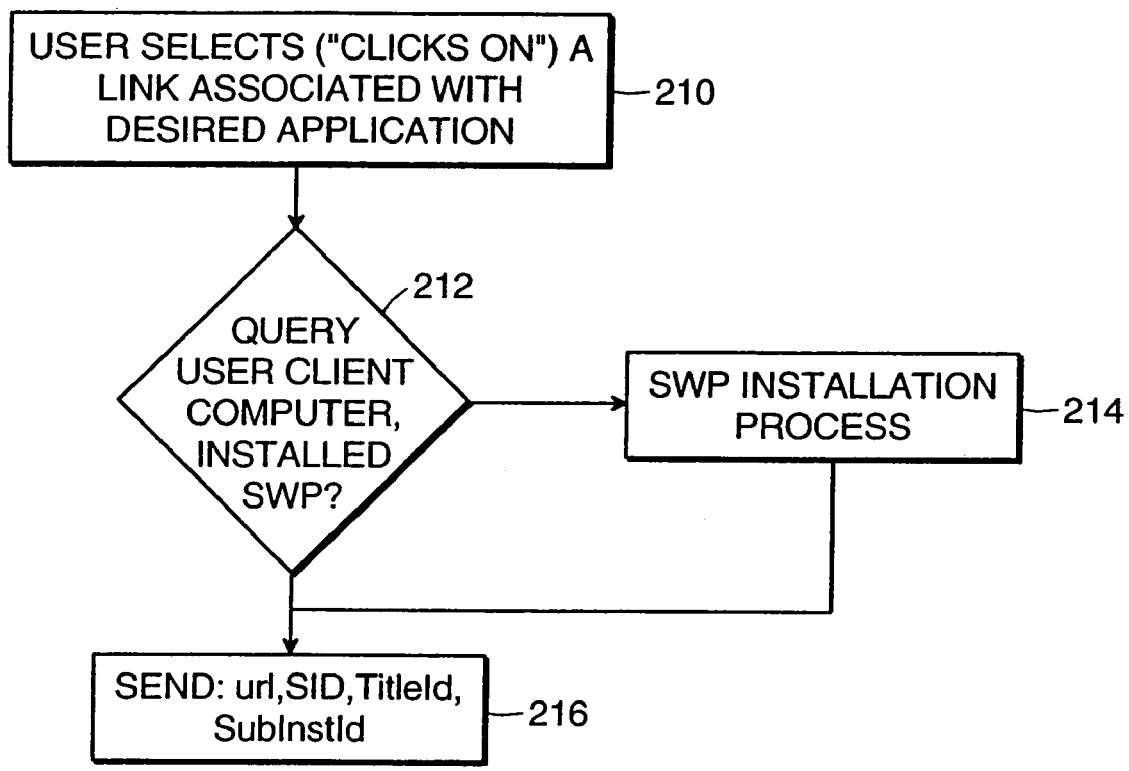
FIG. 2 is a flow diagram illustrating the method by which the serving of applications to the target computer is initiated at the third-party subscribing institution according to the present invention.

FIG. 2 shows the steps performed by or at the target computer 110 to initiate the serving of an application from the server system 112. Specifically, a user at the target computer identifies a desired application to the target computer 110 in step 210. In the typical case, the browser 134 is executing on the target computer 110 and a link is displayed in the browser window. This link is identified and/or associated with the application that the user desires to execute on the target computer. The user, operating a graphical pointing device, such as a mouse, controls the target computer's graphical user interface to select or "click-on" the link for the desired application.

Selection of the link in step 210 causes the browser 134 to interrogate the target computer's operating system to determine whether the appropriate software player (SWP)

has been installed on the target computer in step 212. This interrogation is performed in one embodiment by an application programming interface (API) call to check the operating system registry. Applets, ActiveX, or scripting, however, are other modalities for performing the interrogation.

If it is determined that the software player has not been installed on the target computer 110, an installation process is initiated in step 214. In the typical implementation, this installation process comprises either pointing the browser 134, or a new instantiation of the browser, with a new universal resource locator (URL), to website that supports the installation of the software player through a download, for example.

The install/download is simplified for ease of operation. In one implementation, a Java applet is used that allows installation and writing to the drive—if permission is provided. A download bar is displayed on the browser screen. When the player 132 has been installed, it begins to run and will launch the application that was initially requested by the user. As a result, the user at the client computer 110 observes the invocation of the application, rather than the software player alone.

Once there is an installed software player, the browser 134 is pointed with a URL to the server system 112, in step 216. The URL link contains: 1) a unique identifier, or number, associated by the server system 112 with the application requested (TitleId); 2) a unique session ID (SID); and 3) an identifier that identifies the subscribing institution (SubInstId). Typically, the subscribing institution is the company that operates the host Web server computer 130, which served the web page that originally contained the link associated with the application that was desired by the user of the target computer 110.

The SID is a unique session ID that is specific to the link and the specific session. A session ID that served as part of the original link provides a token from the web site that indicates that the subscribing institution has authenticated this specific session. This is important for the rental/subscription model where they will be authenticating users with credit cards or user names and passwords.

Figure 3:
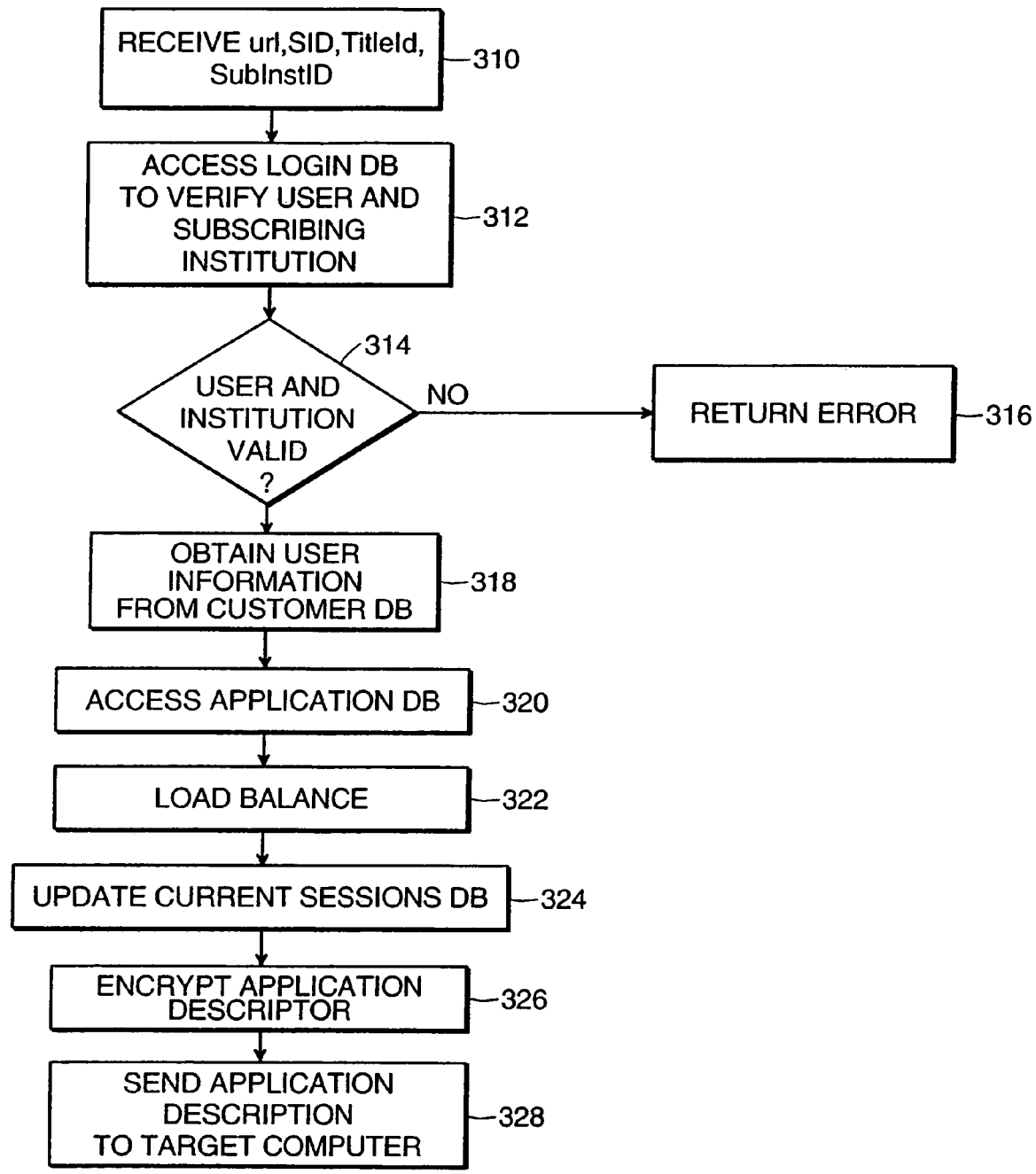
FIG. 3 is a flow diagram illustrating the steps performed by the server system when the target computer requests an application.

FIG. 3 shows the steps performed by the server system 112 when the target computer 110 requests an application by transmitting the URL containing the SID, TitleId, and SubInstId to the server system 112 over the network 114.

Specifically, in step 310, the server system 112 receives the URL, SID, TitleId, and SubInstId. The server system then accesses the log-in database 116 to verify that: 1) the user at the target computer 110 is a valid user by reference to the session Id field (SID); and 2) the subscribing institution is a currently valid subscribing institution by reference to the SubInstId field in step 312. If either the user or subscribing institution is invalid (step 314), an error is returned to the target computer 110 in the step 316 by the server system 112.

If the user and subscribing institution are verified, the server system 112 then proceeds to construct an application descriptor or data file that will coordinate the operation of the target computer 110 and the server system 112 across the network 114. In the present implementation, the application descriptor is a file that is named with a ".WOW" suffix, which is the MIME type.

Specifically, in step 318, the server system 112 accesses the customer database 118 using the SID to obtain information regarding the session.

Next, in step 320, the application database 120 is accessed. This contains information concerning the application, which was requested by the user. For example, the application database 120 contains information such as minimum system requirements (RAM, processing power, etc.) that are required by the application on the target computer 110 and the application's media weight or processing requirements on the server system 112 associated with each instantiation.

In step 322, the load balancing process 126 is executed. The server system 112 selects a host computer within the server system that will be primarily responsible for serving the application over the network 114 to the target computer 110. In the typical embodiment, the server system comprises multiple host Web and associated application servers. The selected host computer is co-located with the other host computers in one implementation; alternatively, components or servers of the server system are located in a server farm and/or geographically local to the target computer 110. In this last case, the load balancing process selects the host computer based on geographic proximity, in addition to load, to reduce latency.

Typically, the load balancing checks the current session's database 122 to determine which host server in the server system 112 has the least load. The list of servers serving the specific application is part of the title's application description. Determination of which server to use is based on the number of concurrent connections to each server and the media weight of each application and also the user's physical geographic location based on the IP address.

Next, in step 324, the current sessions database 122 is updated in step 324 with the current session being added. Specifically, the session ID, the user's IP (internet protocol) address, the application title, the media weight, and the server assigned to the session is added. This database is used by the load balancing process 126, and by a watch-dog process that watches the connections to each host server in the server system, to verify that all connections are from authorized users.

In step 326, the application descriptor is encrypted. Minimally, this application descriptor comprises the host address of the host computer of the server system 112, which was assigned by the load balancing process 126 along with a session ID assigned as part of the update of the current session database 122. Finally, the application descriptor is sent to the target computer 110 in step 328.

Figure 4:
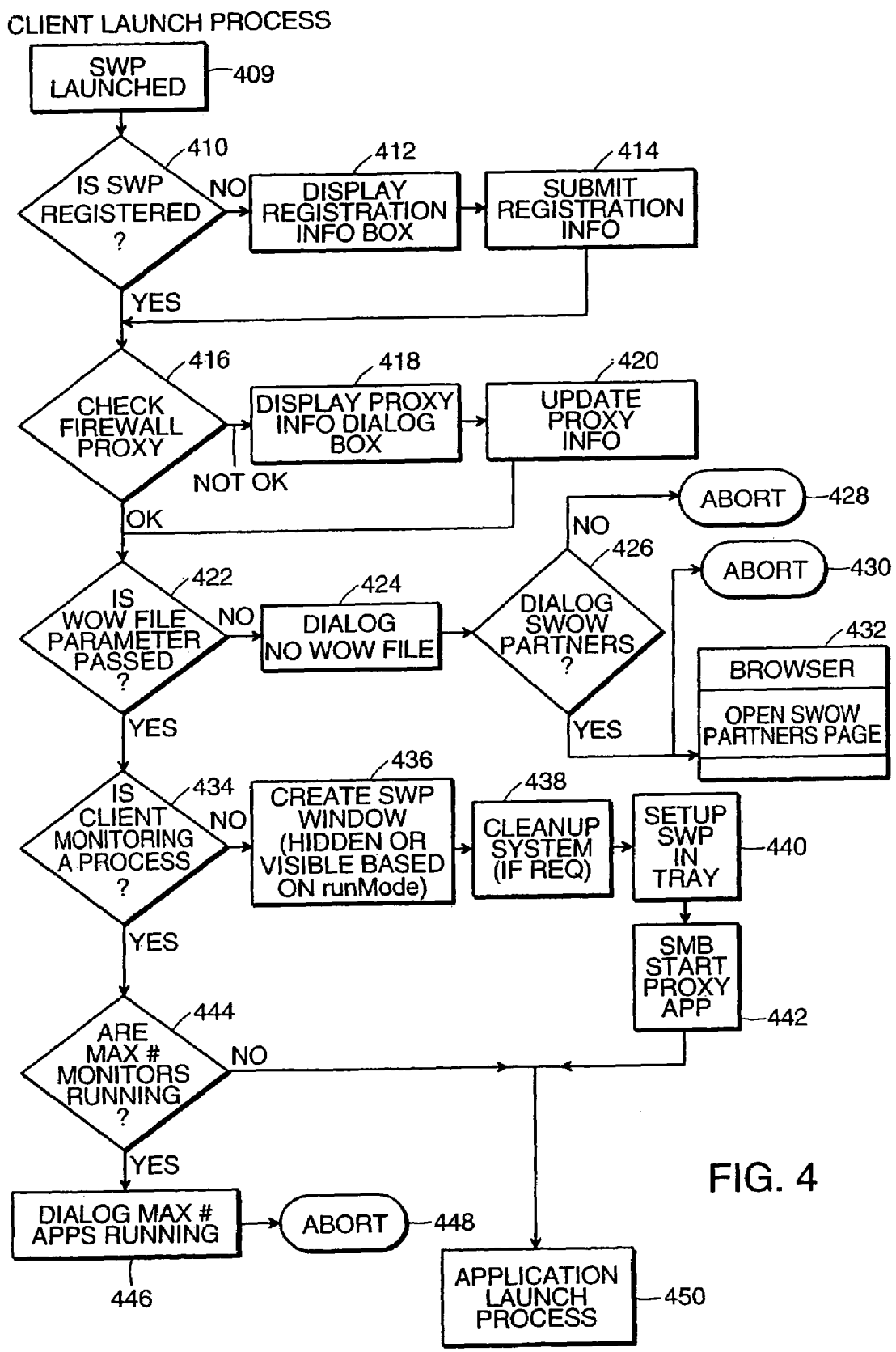
FIG. 4 is a flow diagram showing the launch process for the helper application, or software player, on the target client computer.

FIG. 4 shows the launch process for the helper application or software player 132.

Upon receiving the .WOW application descriptor file, the client launches the software player 132 in step 409. This is a helper application that performs the bulk of the client-side application management.

In the preferred implementation, the receipt of the WOW descriptor file automatically launches the software player. This is accomplished by configuration of MIME types during the software player's initial installation. In the Windows 95 operating system, MIME types are set in the registry, associating files with a specified suffix, here: WOW, that are to be opened with the software player 132.

Many of the methods used employ Windows API Functions to control the executed applications. In one embodiment of the invention, the Buddy API Xtra (a library of calls employed by programmers of Macromedia Director) is used to access Windows API functions. Specifically, the initial writing to the registry is done with the baWriteRegNumber and baWriteRegString commands in Buddy API.

In step 410, the registration status of the software player 132 with respect to the server system 112, or institution operating the system, is determined. If it has not been registered and/or properly licensed, a registration box is displayed on the graphical user interface of the target computer 110 in step 412. The user is either requested or required to complete the registration information box, depending on the implementation. Once completed, the registration information is sent, in step 414, to the server system 112 over network 114.

After registration, the status of any firewall proxy for firewall 111 is interrogated in step 416. If it is not valid, a proxy information dialog box is displayed in step 418, and the user is requested to complete it on the target computer 110. Once completed, the proxy information is updated in step 420.

Next, the status of the application descriptor, or WOW file is interrogated in step 422. If no application descriptor file is detected, a dialog is generated in step 424, on the target computer 110 for the user. The user is requested to enter a partner or subscribing institution. If it is determined that no institution has been entered in step 426, the process aborts. However, if a subscribing institution was entered, the process similarly aborts in step 430, but also points the browser 134 to the Web page for the subscribing institution in step 432.

Next, in step 434, it is interrogated as to whether the client is monitoring a similar process, i.e., the software player 132 is currently running on the client. If it is not running, the SWP window is created in step 436. Depending on the run mode, the window is either hidden or visible on the client interface. In step 438, any system clean-up is performed. Generally, the operating system registry is written to when applications 133 are run. The software player tracks those modifications, and any registry changes; these changes are undone when the application 133 and software player 132 are quit. However, if the software player 132 was terminated unexpectedly during its last operation, the registry clean-up may not have been performed. If not, the clean-up occurs in this step. Specifically, any modified registry settings are returned, icons are removed, folders in any disk drive are removed, and any new copies of applications on the desktop are removed. Next, the player is set up on the OS tray. Finally the port proxy application is started in step 442 prior to the application launch process in step 450 in the preferred embodiment.

Generally, the port proxy application is required because the preferred embodiment of the present invention utilizes standard Microsoft Windows 95/98/NT/2000 operating system networking protocol implementation of SMB (server message block), the functionality of which is blocked on may client computers. This standard protocol operates over port 139. However, since it is a sharing protocol, it is deemed dangerous or non-secure, and communications through this port are blocked by many commercial, government, and/or corporate firewalls.

The use of the port proxy is not limited only systems using the SMB protocol, but is deployable in any environment where the port and or network communications protocol used by the player is blocked, or possibly blocked, on the client computer. Generally, the port proxy enables a protocol to be redirected to another port such as HTTP or web ports.

If it was determined that the SWP is currently monitoring a process and thus invoked, in step 444, the status of the target computer operating system is interrogated in step 444. If too many applications are currently running, a dialog is generated notifying the user in step 446 and the process aborts in step 448. However, if there is sufficient resources to run the application, the new launch application process is started in step 450.

Figure 5A:
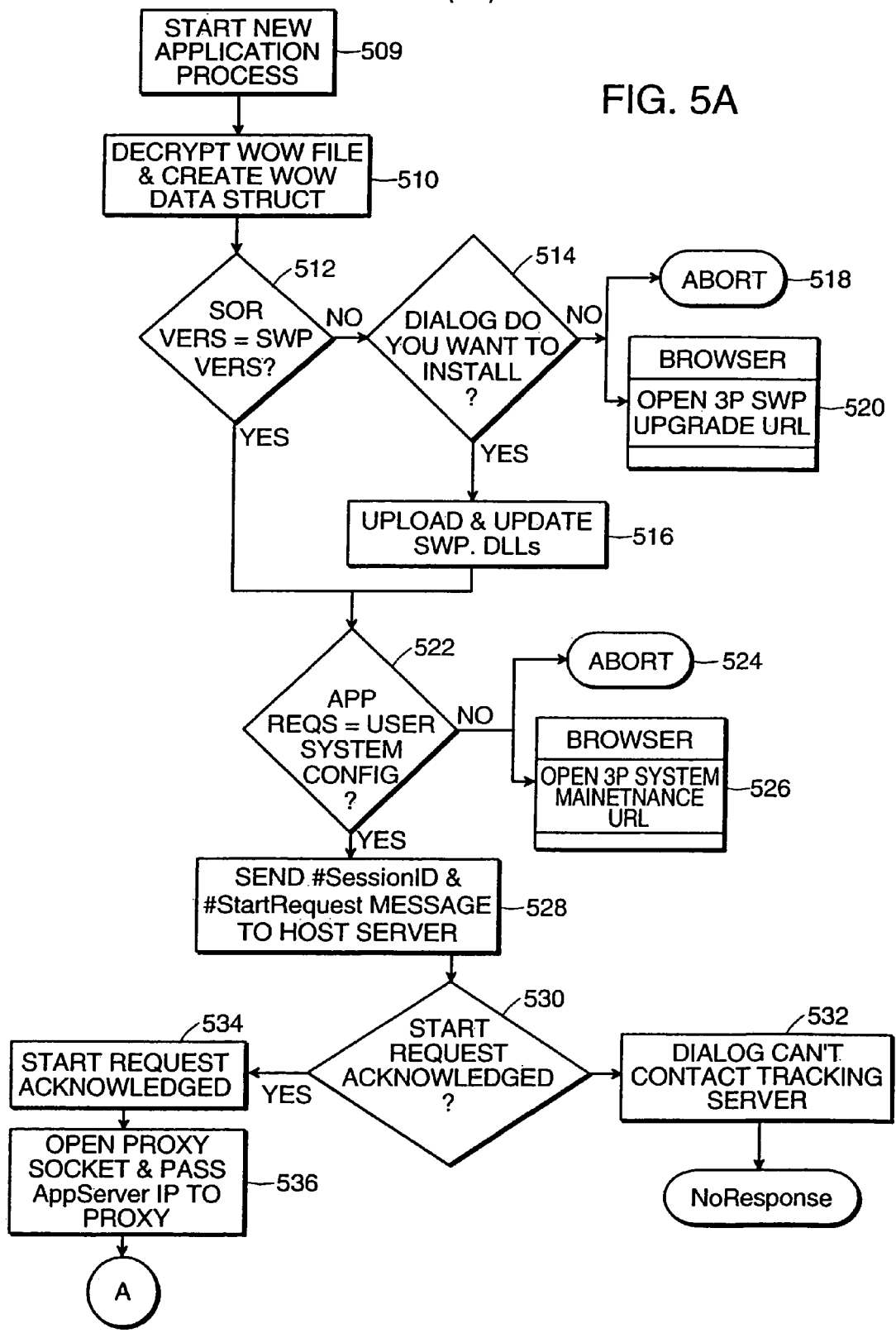
FIGS. 5A and 5B are flow diagrams showing the application launch process that is performed on the target client computer.
Figure 5B:
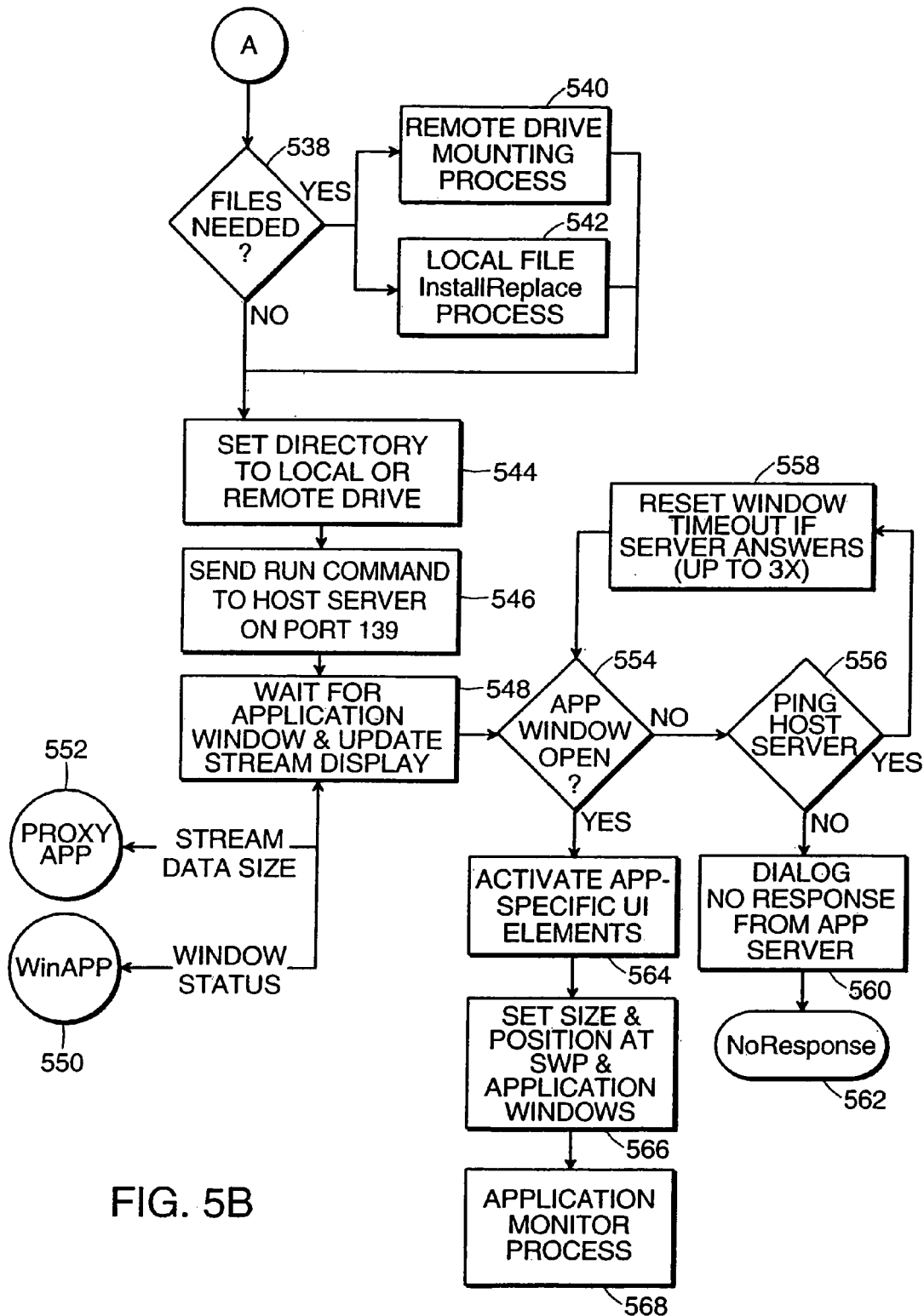

FIGS. 5A and 5B show the application launch process.

Specifically, the software player 132 reads and decrypts the incoming application descriptor WOW file in step 510. To read in the encrypted data, the program uses the baCommandArgs command in the Buddy API. The decryption of the commands is done via the baDecryptText command in the Buddy API.

Once decrypted, the software player 132 checks to see if this is the first time it has been run on the client computer 110 by checking the computer's internal settings to see if a unique ID has been written to the settings. This is done via the baReadRegString command in Buddy API. If it finds the unique ID, it continues. If it does not find a unique ID, it asks the user for personal information that will be collected for a User Database, in one exemplary implementation.

It then creates a WOW data struct also in step 510. The version of the application descriptor is then compared to the version of the software player 132 in step 512 to ensure compatibility. If there is no compatibility, a dialog is displayed in step 514 asking the user if they wish to upgrade to a new software player. If the user agrees to upgrade, the new dynamic link libraries (.DLL files) are downloaded from the server system 112 in step 516. The software player unloads the current dynamic link libraries and updates the DLL's in step 516.

In contrast, if the user chooses not to install the new software player in step 514, the process aborts in step 518, while simultaneously pointing the browser 134 with an upgrade URL to a site hosted by the server system 112 or hosted by another server in step 520.

If the process is not aborted, in step 518, the application requirements contained in the application description are compared to the target computer's configuration in step 522. If there are inadequate resources, the process aborts in step 524. Additionally, the browser 134 is pointed toward a web page hosted by the server system providing for maintenance. Specifically, the maintenance URL is passed to the browser in step 526. For example, a minimum or maximum screen depth, resolution, RAM requirements, processor requirements, sound board requirements, and video board requirements are assessed. These checks are supported by the following commands in Buddy API: baVersion("os"), baVersion("qt"), baVersion ("qt3"), baScreenInfo("height"), baScreenInfo("width") and baScreenInfo("depth").

If the user system's resources are determined to be adequate in step 522, a message is sent from the target client computer 110 to the server system over the network 114 in step 528. The message contains the session ID, which was just received from the server system in the application descriptor file. Also, a start request message is sent to the server system. The receipt of the session ID identifies the session and implicitly notifies the server system 112 that the target computer has successfully decrypted the application descriptor file, which had been previously sent. The start request indicates that the target client computer is now ready to begin to execute the requested application.

Also, the software player 132 preferably determines, via the application descriptor, the transaction mode being used. This will impact the appearance of the player 134 on the screen or GUI of the computer 110. For example, if the application descriptor identifies itself as an advertisement-based transaction (noted as an "a" in the Application Descriptor), then the software player 132 will respond by positioning itself at the top level of the screen depth and begin to request advertisements from an advertisement server, within the server system 112, over the network 114. Conversely, if the application descriptor identifies itself as a subscription-based (noted as an "s" in the application descriptor), the software player 132 will hide itself, but continue to execute in the background. To hide itself the program uses the baWindowState command in Buddy API. The ads are obtained through hypertext transfer protocol (http) calls.

In step 530, the target client computer 112 then waits for a start request acknowledgment from the server system 112. If no acknowledgment is received after a predetermined time period, a dialog is displayed on the target client computer 110 to notify the user that the server system is currently unavailable in step 532.

If the start request is acknowledged in step 534 by the server system 112, a proxy socket is opened in the target computer 110 and the application server address is passed to the proxy in step 536.

Continuing onto FIG. 5B in step 538, the software player 132 determines if any files are required from the server system 112 to continue the launch process. If additional files are required, they can be obtained by initiating a remote drive mounting process in step 540. Alternatively, the files can be obtained using a local file installation and replace process in step 542. Additionally, both processes could be used if multiple files are required.

Certain applications require specific files at specific locations. For example, certain anti-virus programs require virus definitions to exist at specific path. Such hard coded path requirements are addressed in this initial configurations check. A file check is performed and any required files are shipped to the client computer before the application is launched.

With the remote drive mounting and possibly local file installation/replace, the target client computer 110 now has access to the files and specifically the code required to invoke the selected application. Next, in step 544, the directory is set to the local or remote drive and the run command is issued to the host server. In one embodiment, this occurs on port 139, the SMB port, from the perspective of the application, but is actually sent through port 80 by the proxy application. Specifically, standard Windows NT remote networking methods are used to attach to the server's directory using the Net Use command, which is part of the Windows Networking.

If the client computer is running the Windows 95-version operating system, there is an additional step taken here. Since Windows 95 computers need to have the name of the server they are attaching to in a file in the Windows directory called LMHOST; the software player 132 writes the name of the server to the LMHOST file using the FileI/O command in Macromedia Director.

The software player 132 then waits for the application window and the update of the stream display in step 548. The window status is acquired by reference to the operating system application programming interface. In the preferred embodiment, where it is operating on a Windows OS platform, the window status is obtained via the WIN API in step 550. The stream data size is obtained from the proxy application in step 552.

In step 554, it is interrogated as to whether or not the application window has opened. Until the window opens, the host server in the server system 112 is periodically pinged. The window timeout is reset as many as three times and as long as the server is responsive to the ping in step 558. If there is no server response to the ping as determined in step 556, the user is notified via the dialog in step 560 and the program aborts in step 562.

If, however, the window opens as determined in step 554, the user interface elements are activated that are specific to the application in step 564. The size and position of the software player and application windows are then set in step 566. At this stage, with the application running on the operating system of the target client computer 110, the process proceeds to an application monitoring in step 568.

In the preferred embodiment, there are six processes that are performed to monitor the application. Application window monitoring, tracking pulse monitoring, advertising updating, net traffic monitoring, count-down timing, and user event handling.

Figure 6A:
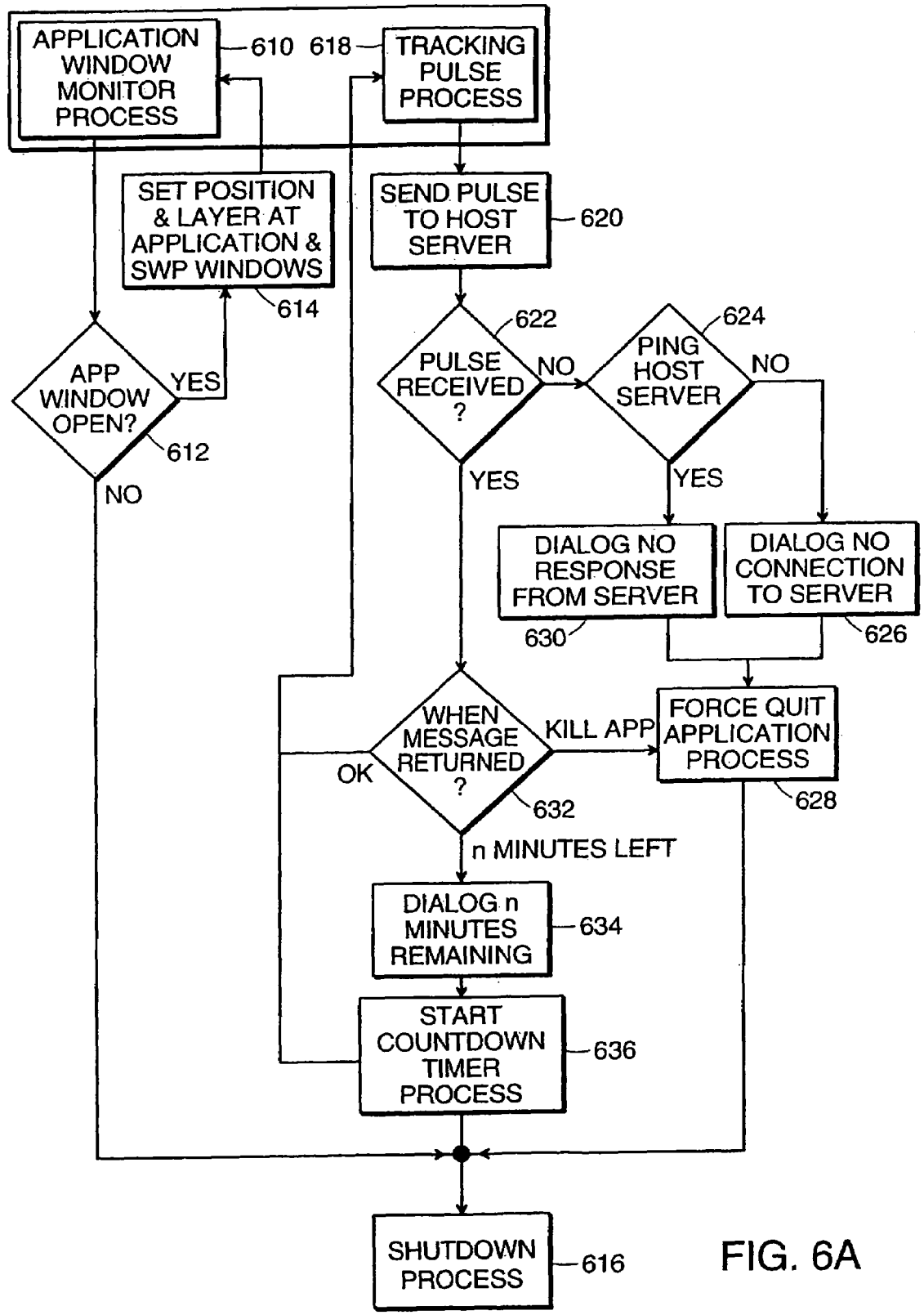
FIGS. 6A–6C are flow diagrams showing the steps associated with the application monitoring process according to the present invention.

FIG. 6A illustrates the steps associated with application window monitor process and the tracking pulse process.

Specifically, while the selected application is executing, the client computer multitasks to also monitor the operation of the application. One of the processes is the application window monitor process 610. Specifically, the application window monitor process 610 periodically makes API calls to determine whether or not the application's window is still open in step 612. If the window is open, it continues to maintain and/or set the position and layer of the windows of the application 133 and the software player 132 with respect to each other in step 614 according to the transaction mode. However, if the application window monitor process 610 determines that the application window has closed, the software player 132 begins the execution of a shutdown process 616.

The tracking pulse process 618 periodically sends a pulse or a ping to the host server of the server system 112 in step 620. If it is determined that no pulse has been received in step 622, the target client computer 110 pings the host server of the server system in step 624. Based on the status of the ping, if it is determined that there is no connection to the server, a dialog is generated in step 626 and there is a forced shutdown of the application process in step 628, and again, the shutdown process is activated 616. If the ping is successfully sent to the server, but no response is received, a dialog is generated in step 628. Again, a "no response" dialog is generated in step 630 and the shut down process is activated in step 616.

In other implementations, tracking is not provided by sending pulses; instead, the application server monitors socket connections to determine if connections are still active. From the client side, instead of the server telling the client to shut down, the client gets its "total time to run" as part of the .wow file and begins counting down—and eventually shuts down—once it hits zero time.

In contrast, if it is determined that the pulse is received in step 622, the message is analyzed. If it is determined that the message is to turn off the application in step 632, the application process is terminated in step 628 and the shut down process is activated, step 616.

If the message returned that the application must be terminated within n minutes, a dialog is generated in step 634, notifying the user of the remaining minutes of access to the application. A countdown timer is started in step 636. Finally, if the message returned is an all clear or o.k. message in step 632, process returns.

Figure 6B:
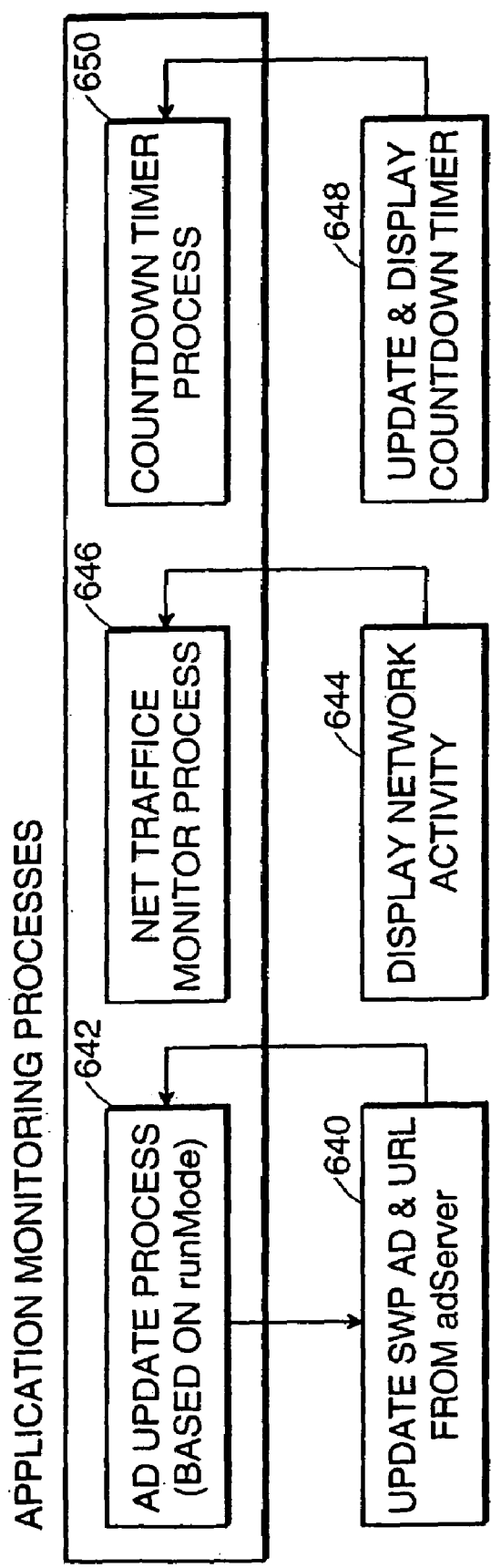

FIG. 6B shows the advertisement update process, net traffic monitoring process, and countdown timer process, which are additionally performed as part of the application monitoring.

Specifically, the ad update process periodically updates the ads displayed on the software player and any URL's required for the ad server in step 640. It then returns to the run mode of the ad process in step 642.

If the transaction mode is advertisement-based, the software player will maintain a +1 depth relationship with the application's window. This means that if the application 133 is brought to the front, the software player 132 will place itself in front of the application 133 so the application cannot hide the advertisements being served. If a different application or window, i.e., one not being hosted by the server system 112, is brought to the front, the software player 132 will not obscure the application or window. It will maintain its +1 depth relation to the application 133. This is accomplished via the baWindowDepth command in Buddy API. Also, the player is monitored so that it is not moved off the screen.

Step 644 monitors network activity and notifies the net traffic monitoring process in step 646. This allows the application monitor to determine if there are any problems associated with high traffic, which would impact the operation of the application.

In step 648, the display countdown timer is updated. This countdown timer notifies the user as to the time remaining in which the application is available. This is most relevant where the user has, for example, "rented" the application for a fixed period of time as indicated by the transaction mode. The countdown timer updates the countdown timer process 650 so that a shut down process is automatically activated when the timer has timed-out.

Figure 6C:
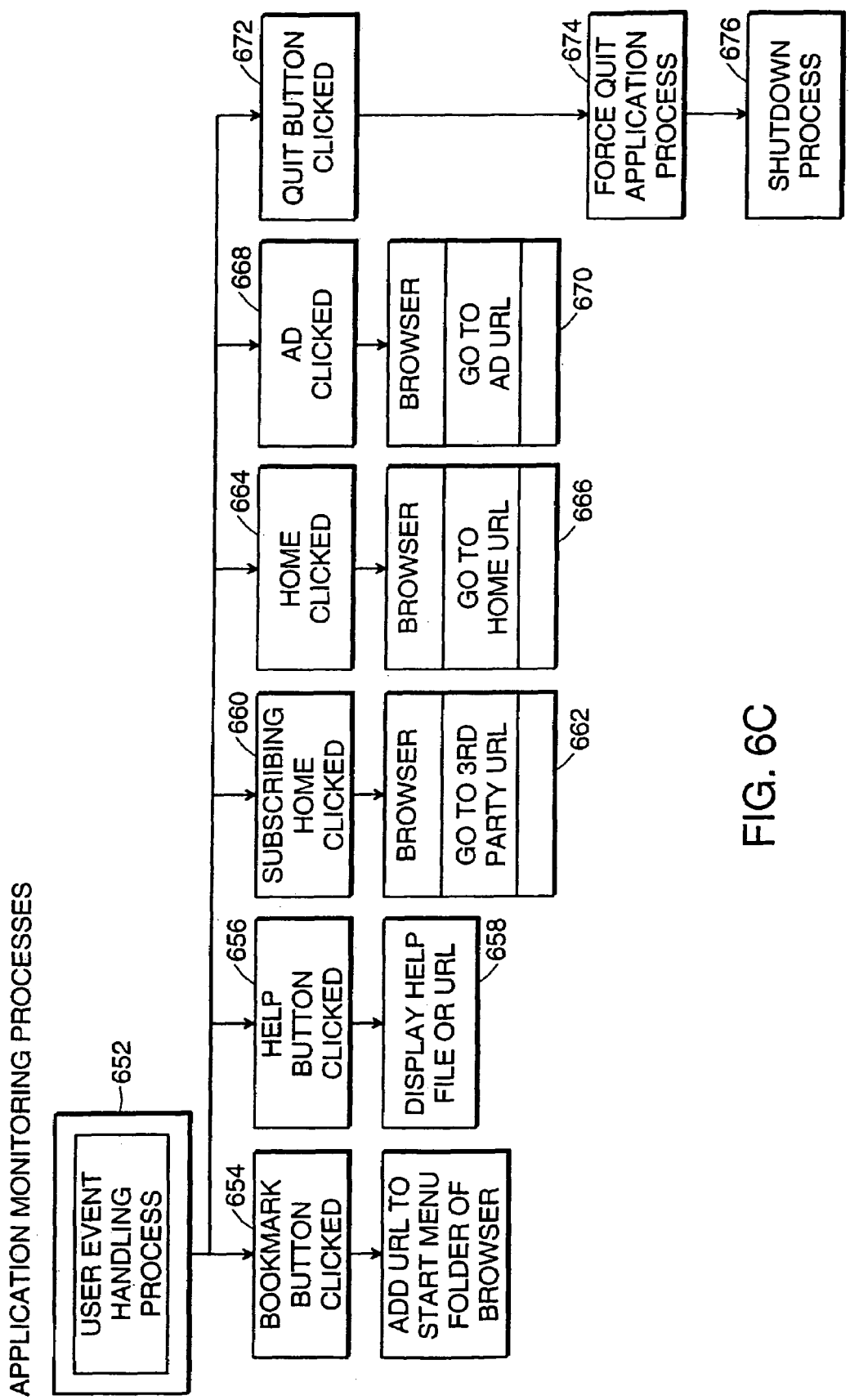

FIG. 6C illustrates event handling process 652 of the application monitoring processes. Specifically, if the bookmark is selected in step 654, the URL of the third-party application hosting institution and its server system 112 is added to the start menu folder of the browser 132.

Currently, the bookmarking feature is termed "Quick Launch"—instead of adding it to the start menu folder system, it gets book-marked as part of a screen in the player—the one that comes up if you click on Quick Launch. It remembers the location from where you initially clicked, thus guaranteeing the web site that they will still get ad revenue and a follow-up page each time the user clicks on the Quick Launch bookmark.

If the help button is selected in step 656, a help file is displayed. The browser 134 is pointed to a URL of a help file server in step 658. If the third party home is selected in step 660, the browser is pointed to the URL or a specified URL of the subscribing institution in step 662. If the home button is selected in step 664, the browser 134 is pointed to the home page of the third-party application hosting system in step 666. If the ad, which is displayed by the player, is selected in step 668, the browser is pointed to the URL of the advertising company in step 670. Finally, if the quit button is selected in step 672, the application is forced to terminate in step 674 and the shutdown process is started in step 676.

Figure 7:
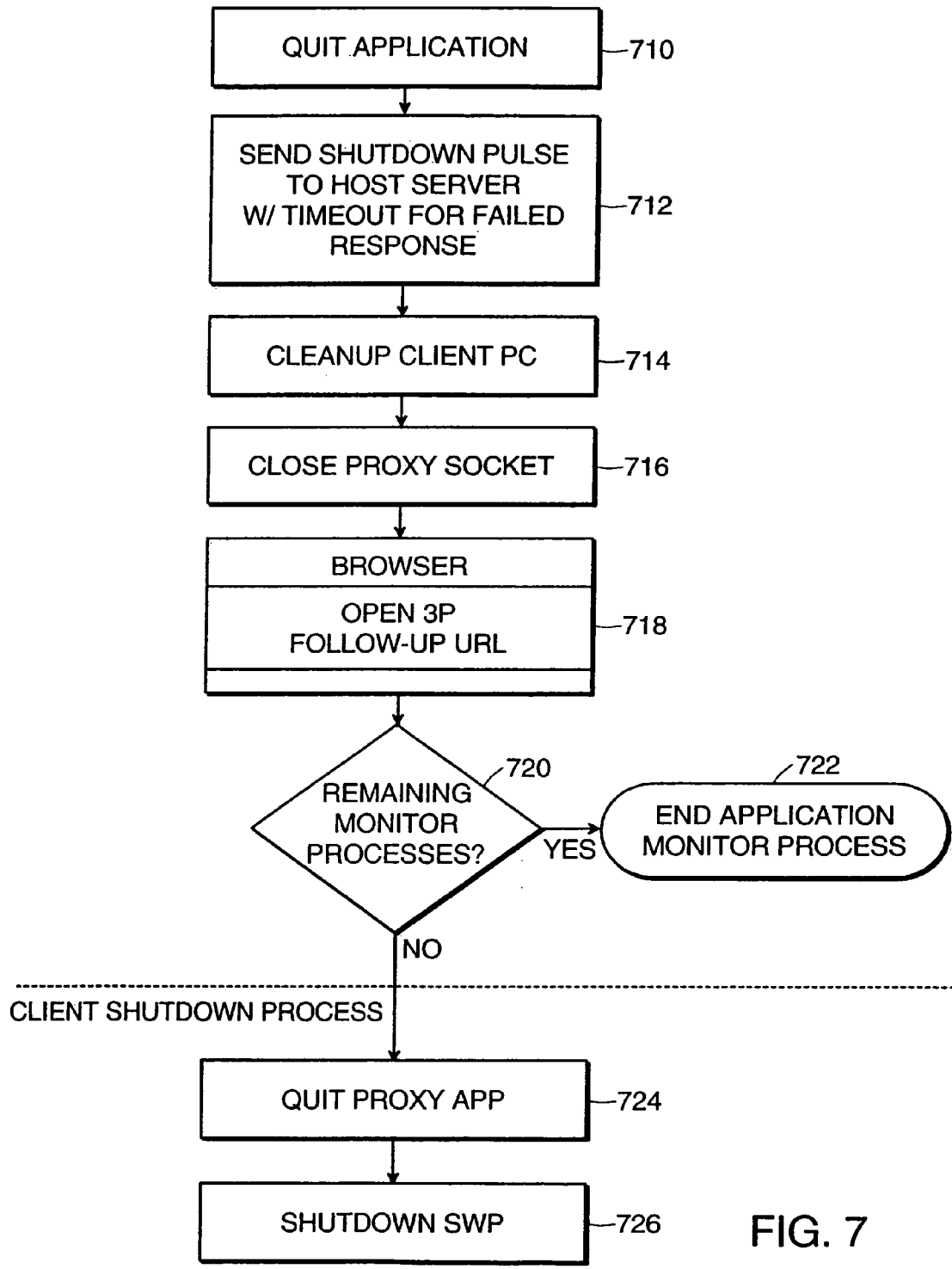
FIG. 7 is a flow diagram illustrating the application shutdown process according to the present invention.

FIG. 7 is a flow diagram illustrating the application shutdown process. Specifically, if the application 133 is desired to be shutdown or quit in step 710, a shutdown pulse or signal is sent from the client computer 110 to the host server of the server system 112 in step 712. Any remnants of the application program are then removed from the operating system 135 and local drives generally, in step 714. Specifically, any modified registry settings are returned, icons are removed, folders in any disk drive are removed, and any new copies of applications on desktop are removed. Next, the player 132 is set up on the OS tray.

Finally, in the preferred embodiment, a follow-up URL is sent to the browser 134 in step 718. In the preferred embodiment, this follow-up URL is for the subscribing institution and is typically hosted by the web server 130, allowing it to follow with a "sales pitch" or to solicit for further purchase of goods and/or services. This allows, in some implementations, the third-party application hosting to be transparent to the user at the target computer. Finally, any remaining monitoring processes are identified in step 720, and the monitoring processes are terminated in step 722.

Finally, in step 724, the proxy application is quit and the software player is shut down in step 726.

Figure 8:
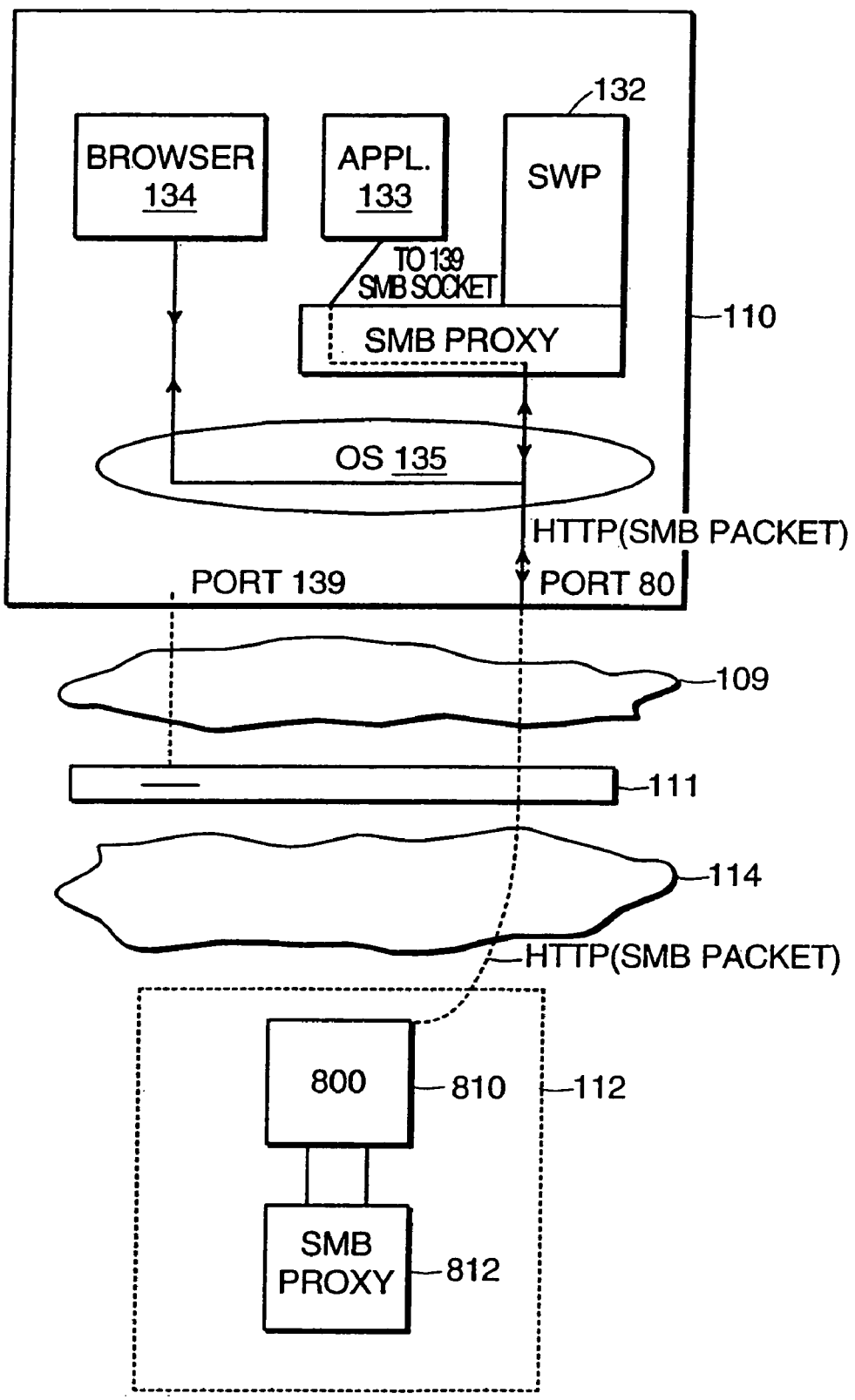
FIG. 8 is a schematic block/communication stack diagram illustrating the operation of the SMB proxy application according to the present invention.

FIG. 8 illustrates the operation of the port proxy of the software player 132. According to the preferred embodiment, when the application 133, through the software player, makes request to server system 112, the request is directed to port 139 as a standard SMB communication by the application. This SMB communication is intercepted by the SMB proxy of the software player 132. The request is redirected, by the proxy, through port 80, which is the http, or web port or some other open port such as the FTP port.

The SMB protocol has been in use on corporate LAN's (local area networks) for nearly twenty years. In that time, it has become a popular vehicle for enabling simple networking. It is at the heart of Microsoft Networking and also in IBM's OS/2. For historical, practical, and security reasons, it has remained a LAN based, however.

Microsoft networking utilizes the SMB protocol to communicate between PC clients and servers to provide file sharing, print sharing, and basic network authentication. Most commonly this is wrapped in the NetBIOS protocol to enable plug and play networking for small, medium and large LANs. The NetBIOS protocol provides for auto-discovery of networks, machine addressing abstraction, and decentralized management of networks.

For ease of use reasons, NetBIOS has grown to be a common standard on corporate LAN's. However, this also presents a significant security risk. A hacker who has broken into or is seeking to break into a corporation's LAN can either wait and "sniff" to find addresses of machines on the LAN, or a smart hacker can broadcast spurious NetBIOS packets and discover the formation of the LAN automatically.

In addition, early implementations of SMB transmitted usernames and passwords without encryption or other security across the LAN. This has since, however, been discovered and patched.

As a result of these two situations, most corporations block traffic to and from the Internet which uses the Net-BIOS protocol. This is typically accomplished at the firewall because the frames identify the port from which they originated. The firewall stops frames based upon their port origination.

According to request for comments (RFC) 1001/1002, TCP and UDP ports 137, 138 and 139 are used for enabling a NetBIOS-based service. Microsoft Networking is such a service, wrapping the SMB protocol with NetBIOS for name resolution and other services. Therefore, all Microsoft Networks behind firewalls or proxies most commonly block these ports to guard their LANs from intrusion. In addition, many ISP's today block this traffic as well, to protect their user's from malicious Internet hackers.

In addition, most corporations have by default blocked all traffic to and from the Internet with only minor exceptions like HTTP, FTP, SMTP and POP3, protocols, which have become a staple in job performance. Therefore, it can be expected that to guarantee provision of any service across corporate firewalls, the use of HTTP as a carrier is the only choice. Though there are many other options, such as SOCKS proxies, or HTTP tunneling, use of standard HTTP over port 80 is preferred.

The proxy of the software player 132 listens for requests for port 139. These are transferred using address 27.0.0.1, which is the address for a loopback. The client computer 110 then monitors this local-loopback address.

Generally, there are three levels of firewalls. Minimally, most firewalls do not route anything from port 139. As a result, if the transmissions are sent through port 80, they can pass through this type of firewall. Even in more secure firewalls, port 80 is typically open. In the most secure type, the firewall blocks port 80, but proxies communications on this port. To handle this last configuration, the SMB communication is preferably encapsulated within an http packet, HTTP(SMB packet). As a result, an http header is added, which comprises a request line followed by a post form-data tag. These types of headers are used when data from a form is typically sent to a script process. For the http post to be performed correctly, the content length, content type, and MIME type are also set.

At the other end of the network, a web server 810 of the server system 112 listens on the corresponding port for the communications. It received the http packet with the post data commands. It strips off the packet's header and then sends the post data to the application server as SMB packets. Thus, the SMB proxy allows to the application 133 to execute as if it were mounting a standard Window NT server using the SMB protocol. Communications, however, are actually occurring over port 80 of the client computer 110.

More specifically, the web server 810 receives and maintains the connection with the client computer over the network. Incoming upload HTTP communications are received and the post data stripped out. These data are then transferred to the application server 812 as SMB protocol communications. The download path is handled by the inverse process where the application server sends SMB packets to the web server, which encapsulates the packets into the post data section of an HTTP packet. The HTTP packet header is then established, and the packet is transmitted to port 80 of the client over the intervening networks.

Alternatively, the proxy application on the client can be rerouted through port 23 (FTP) with the server returning on port 21, also reserved for FTP transfer, in another embodiment, if those ports are open.

If the web server 810 is not used, the use of the SMB proxy and port 80 communications requires that the operating system of the host application server in the server system be non-standard. In the one implementation, the server code has been recompiled to support SMB communications over port 80 instead of port 139. This necessitates the use of open source operating systems that implement Standard Microsoft Windows 95/98/NT/2000 protocols.

Figure 9:
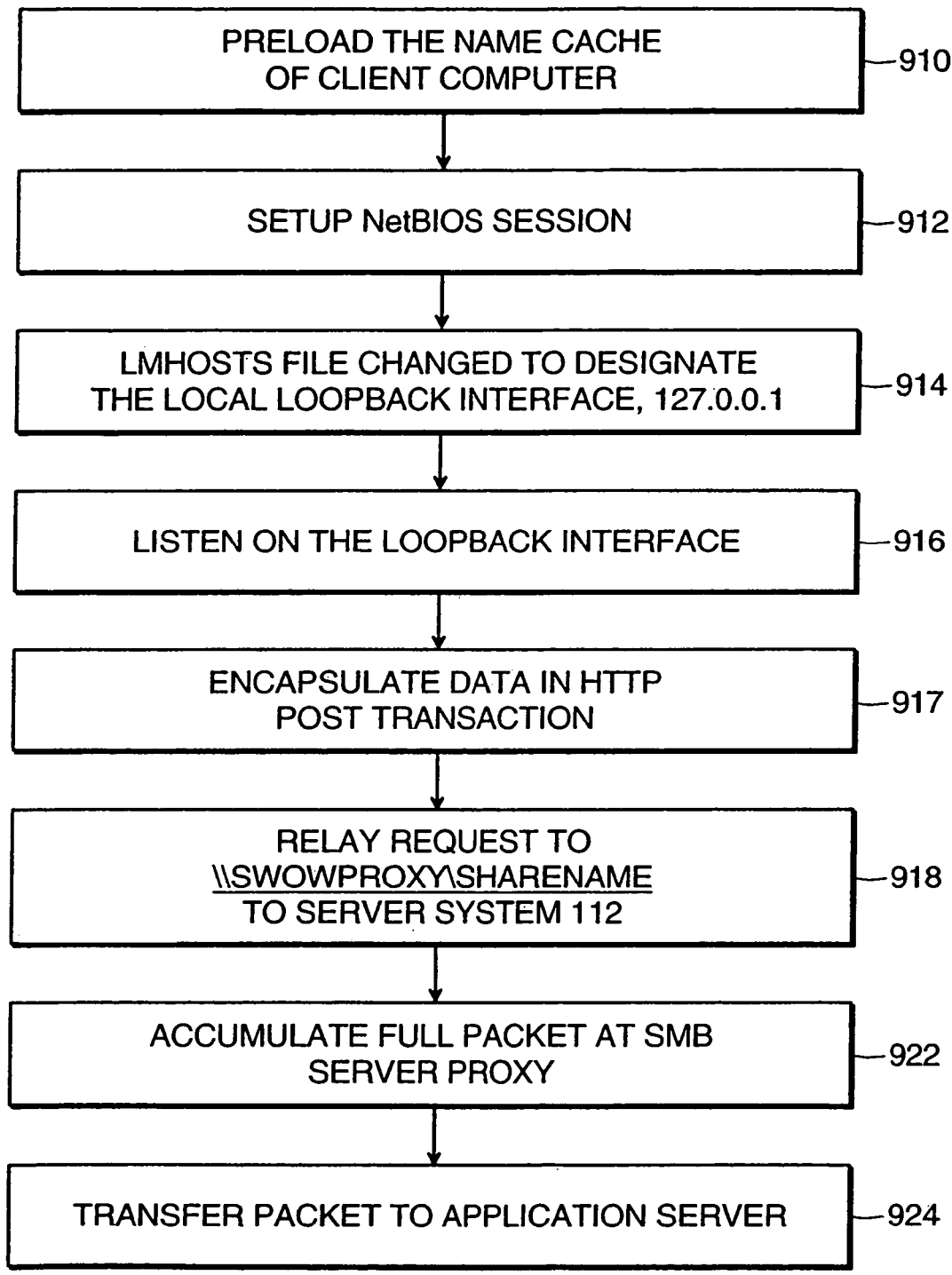
FIG. 9 is a process diagram illustrating the operation of the port proxy.

FIG. 9 illustrates the port proxy process.

Client 110 computer will request a file from a server by making a request in the form of \\COMPUTERNAME\SHARENAME. The COMPUTERNAME is a 15 character mnemonic for some machine in the user's network. The client PC will then try to resolve the COMPUTERNAME into a MAC address /IP address for the destination computer. This is done through a series of measures. First, the client will check its name cache for a pre-existing entry. Then it will try to resolve the name via broadcast to the network for any machine responding to this name or response from a machine which has already resolved this name. As a last fallback, the computer will check a special file, the LMHOSTS file, for a hard coded address.

This process generates a small amount of LAN traffic, which if the remote computer is not on the local LAN, will most likely be blocked by the firewall. This traffic constitutes the requests on ports 137 and 138 TCP and UDP. In the present embodiment, the software player 132 uses the LMHOSTS file to preload the name cache of client computer to avoid the network requests for name resolution in step 910.

The next phase is called NetBIOS Session Setup in step 912. During this phase the PC client will establish a connection to the remote computer, COMPUTERNAME, using the default, pre-assigned port, 139. In the case of Microsoft Networking, SMB is then used to establish a connection to SHARENAME and gain the files requested.

The NetBIOS Session Setup request is retargeted. This means that a valid response to a NetBIOS Session Setup is the IP address and port of a different machine which serves the information sought by the client computer 110. Using a small program, an entry is made into the LMHOSTS file designating the local loopback interface, 127.0.0.1, be given the NetBIOS name SWOWREDIR, in step 914. All requests then to \\SWOWREDIR\SHARENAME are redirected on the fly to the machine designated by the software player 132. Also, the request can be retargeted to use the FTP control port, 21. This enables further penetration of many corporate firewalls.

The NetBIOS session is preferably proxied as described. Specifically, the port proxy of the player 132 listens again to the loopback interface under the name SWOWPROXY in step 916. Then any request to \\SWOWPROXY\SHARENAME are relayed to address of the server system 112 over port 21 in step 918.

First, however, the NetBIOS session is preferably wrapped in HTTP in step 917. The port proxy, rather than simply relaying packets, queues up a request until a predetermined point is reached. The current accumulated data are then sent to the server system in the form of an HTTP POST transaction.

In this final case, NetBIOS and SMB packets are not simply relayed. The port proxy of the player 132 assembles the SMB packets into requests. The proxy will queue up a request until it is complete, then forward it in its entirety to the other end of the HTTP connection, a server side HTTP proxy.

In the case of the client, the proxy will read the first four bytes of an SMB request. This determines the number of bytes which are to follow and the actual SMB/NetBIOS command. Each request is then read to completion and then transmitted using the HTTP protocol to the server side proxy. The format of this transmission follows an HTTP POST transaction as this example shows:

Outgoing SMB request:
0x85 0x00 0x00 0x00 (SMB Keep Alive)
Proxy intercepts and resends as:
POST /cgi-bin/send.cgi?123456789012 HTTP/1.0
User-Agent: Mozilla/4.0 (compatible; SoftwareWow; 1.0)
Accept: */*
Accept-Encoding: gzip
Accept-Language: en-us
Pragma: no-cache
Host: www.softwarewow.net:80
Content-type: multipart/form-data; boundary=----------------------------

YYYYMMDDHHMISS
Content-length: 201
----------------------------YYYDDHHMISS
Content-Disposition: form-data; name=""command"'; filename=""

Content-Type: application/octet-stream
0x85 0x00 0x00 0x00
----------------------------YYYYMMDDHHMISS In this above case, the code 1234567889012 represents a unique session identifier used by the server side proxy to track the HTTP connections between requests. The actual URL is irrelevant, but is used to detract hackers from prodding at the server. If a request is made for an alternate URL, a 404 Not Found response is sent by the server side proxy. The next 6 lines of HTTP are used solely to adhere to HTTP standards, without these lines many proxy servers will ignore the request, deeming our proxy not to be a valid web browser.

The next two lines, Content-type and Content-length identify that what is to follow is a series of MIME encoding postings that the web server will know how to deal with. The Content-length is vital, without it most proxies will delay the request, not knowing when it has ended. Additionally, YYYYMMDDHHMISS represents a time stamp used to simply increment and vary the boundary stamp used in the MIME encoding as per RFC requirements.

If the target computer 110 is behind an HTTP proxy/firewall, the first line will be rewritten as follows instead to accommodate the requirements of the HTTP proxy:

POST http://www.softwarewow.net/cgi-bin/send-.cgi?123456789012 HTTP/1.0

The server side proxy on the web server 810 will parse this input and strip out the SMB Keep Alive packet, and transfer it to the SMB server 812 in step 922. Once a full packet is received from the SMB server in step 924, the HTTP server side proxy will transmit the response as follows:

HTTP/1.0 200 OK
Date: Mon, 13 Mar. 2000 20:50:15 GMT
Server: SoftwareWow 1.0
Connection: close
Content-type: application/octet-stream
Content-length: 4
0x85 0x00 0x00 0x00

This response identifies a return of an SMB Keep Alive to the client PC. The server must respond in the first line with a valid response code, 200 represents a valid transaction. Then the server will respond with MIME identification of the type and size of response. On the response, no MIME boundaries are required if the server is solely sending back one packet of type application/octet-stream, which identifies a binary object is being returned. The client SMB proxy will then parse the number of bytes specified in the Content-length header and return these to the true SMB client, closing its connection to the HTTP proxy server.

As HTTP connections are stateless and incur a full TCP setup time to establish, it is an often used practice to utilize an HTTP/1.1 feature called HTTP Keep Alive. As a further enhancement to the above protocol, the SMB proxy could maintain its connection with the HTTP proxy and send multiple requests down the socket. This practice is covered in the HTTP/1.1 RFC.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for serving executable application programs over a computer network from an application server system to a target computer having a helper application provided by the application server system, the method comprising:
    signaling the application server system with a request for an application program;
    receiving application descriptor from the application server system in response to the request;
    executing the helper application in response to the received application descriptor;
    determining, by the helper application a configuration to allow the target computer to execute the requested application program as function of the application descriptor;
    controlling, by the helper application execution of the application program on the target computer, the application program residing on the application server system, the helper application implementing the configuration on the target computer, wherein portions of the application program are retrieved and executed from the application server
    tracking a status of the execution of the application on the target computer; and
    removing, by the helper application, the retrieved and executed portions of the application program from the target computer in response to termination of the application program on the target computer.

2. The method of claim 1, further comprising:
    terminating, by the helper application, the application program when the helper application determines a connection to the application server system is no longer active.

3. The method of claim 1, wherein the signaling further comprises:
    selecting a link by a user of the target computer, said link displayed by a browser executing on the target computer, and said link associated with the application program.

4. The method of claim 3, wherein the link includes an application identifier for identifying the requested application program to the application server system.

5. The method of claim 3, wherein the link points the browser to the application server system.

6. The method of claim 3, wherein selecting the link comprises triggering the downloading of the application descriptor from the application server system to the target computer.

7. The method of claim 1, wherein the received application descriptor is encrypted.

8. The method of claim 1, wherein the helper application includes a graphical user interface for displaying advertisements.

9. A The method of claim 1, further comprising:
    issuing, by the helper application, a command to a browser to a display a follow-up page in response to termination of the application program.

10. The method of claim 1, wherein the application descriptor includes minimum system requirements information for determining the availability of adequate system resources on the target computer for execution of the application program.

11. The method of claim 1, wherein the application descriptor includes transaction mode information.

12. The method of claim 1, further comprising:
    attaching, by the target computer, to a host computer to receive the application program wherein the application descriptor includes application server information including a host address of said host computer.

13. The method of claim 1, further comprising:
attaching, by the target computer, to a host computer to receive an advertisement wherein the application descriptor includes application server information including a host address of said host computer.

14. The method of claim 1, further comprising:
sending, by the helper application executing on the target computer, error log information to a failure server of the application server system in response to improper operation of the application program on the target computer.

15. The method of claim 1, further comprising:
mounting, by the target computer, a remote drive of the application server system, said remote drive providing access to the application program.

16. The method of claim 1, further comprising:
accessing, by the target computer, the application server system via port 80.

17. A method for serving executable application programs over a computer network from an application server system to a target computer, the method comprising:
transferring a helper application to the target computer, said helper application executing on the target computer;
receiving a request for an application program from the target computer;
sending an application descriptor to the target computer in response to the received request wherein the helper application determines a configuration to allow the target computer to execute the requested application program as a function of said application descriptor, and wherein the helper application controls execution of the application program on the target computer as the application residing on the application server system, the helper application implementing the configuration on the target computer, wherein portions of the application program are retrieved and executed on the target computer;
tracking a status of the execution of the application on the target computer; and
removing, by the helper application, the retrieved and executed portions of the application program from the target computer in response to termination of the application program on the target computer.

18. The method of claim 17, wherein the application descriptor includes application server information including one or more host addresses, each host address corresponding to a host computer and wherein the application server system comprises of two or more host computers, the target computer attaching to a first host computer indicated by a first host address included in the application server information to receive the application program portions.

19. The method of claim 18, wherein the first host computer is selected to load-balance across the two or more host computers of the application server system.

20. The method of claim 18, wherein the target computer attaches to a second host computer to receive an advertisement.

21. A method as described in claim 17, further comprising:
sending, by the helper application executing on the target computer, error log information to a failure server of the application server system in response to improper operation of the application program on the target computer.

22. An application serving system configured to operate across a computer network, the system comprising:
an application server configured to execute computer-executable instructions for:
transferring a helper application to the target computer, said helper application executing on the target computer;
receiving a request for an application program from the target computer;
sending an application descriptor to the target computer in response to the received request wherein the helper application determines a configuration to allow the target computer to execute the requested application program as a function of said application descriptor, and wherein the helper application controls execution of the application program on the target computer as the application residing on the application server system, the helper application implementing the configuration on the target computer, wherein portions of the application program are retrieved and executed on the target computer;
tracking a status of the execution of the application on the target computer; and
a target computer executing the helper application transferred by the application server configured to execute computer-executable instructions for:
signaling the application server system with a request for an application program;
receiving application descriptor from the application server system in response to the request;
executing the helper application in response to the received application descriptor;
determining, by the helper application a configuration to allow the target computer to execute the requested application program as function of the application descriptor;
controlling, by the helper application execution of the application program on the target computer, the application program residing on the application server system, the helper application implementing the configuration on the target computer, wherein portions of the application program are retrieved and executed from the application server;
tracking a status of the execution of the application on the target computer; and
removing, by the helper application, the retrieved and executed portions of the application program from the target computer in response to termination of the application program on the target computer.

23. The method of claim 22, wherein the application server provides an update to the helper application of the target computer in response to the received request for the application program.

24. The method of claim 22, wherein the helper application validates the status of a firewall proxy to allow streaming of the application program elements from the application server to the target computer.

25. The method of claim 22, wherein receiving the application program elements comprises receiving streaming data including the application program elements.

26. An application serving system configured to operate across a computer network, the system comprising:
an application server configured to execute computer-executable instructions for:
transferring a helper application to the target computer, said helper application executing on the target computer;
receiving a request for an application program from the target computer;

sending an application descriptor to the target computer in response to the received request;

sending to the helper application on the target computer a configuration to enable the target computer to execute the requested application program as a function of said application descriptor;

sending portions of the application program to the target computer in accordance with communications from the helper application as it controls execution of the application program on the target computer as configured based on the sent configuration, the application residing on the application server system, wherein the portions of the application program are transmitted for execution; and tracking a status of the execution of the application on the target computer; and removing, by the helper application the retrieved and executed portions of the application program from the target computer in response to termination of the application program on the target computer.

* * * * *